(12) United States Patent
Pinkham, Jr. et al.

(10) Patent No.: US 7,607,240 B2
(45) Date of Patent: *Oct. 27, 2009

(54) METHOD OF DRYING ROVING PRODUCTS

(75) Inventors: Daniel Pinkham, Jr., Highlands Ranch, CO (US); Gerard Joseph Demott, Evergreen, CO (US); Gary Groner, Littleton, CO (US)

(73) Assignee: Johns Manville, Denver, CO (US)

( * ) Notice: Subject to any disclaimer, the term of this patent is extended or adjusted under 35 U.S.C. 154(b) by 264 days.

This patent is subject to a terminal disclaimer.

(21) Appl. No.: 11/805,374

(22) Filed: May 23, 2007

(65) Prior Publication Data

US 2008/0289211 A1 Nov. 27, 2008

(51) Int. Cl.
*F26B 11/00* (2006.01)

(52) U.S. Cl. .............................. 34/397; 34/392; 34/413; 432/58; 210/771; 219/400

(58) Field of Classification Search .................. 34/397, 34/413, 392, 60, 77, 80, 90; 432/58; 210/771; 219/400

See application file for complete search history.

(56) References Cited

U.S. PATENT DOCUMENTS

| | | | | |
|---|---|---|---|---|
| 1,455,392 A | * | 5/1923 | Diepschlag | 241/47 |
| 1,518,926 A | * | 12/1924 | Hiller | 554/8 |
| 1,735,393 A | * | 11/1929 | Hiller | 241/66 |
| 1,932,830 A | * | 10/1933 | Puening | 34/102 |
| 2,049,071 A | * | 7/1936 | McCormick | 34/397 |
| 2,171,535 A | * | 9/1939 | Ragnar et al. | 110/225 |
| 2,213,667 A | * | 9/1940 | Dundas et al. | 110/220 |
| 2,230,832 A | * | 2/1941 | Douglass | 34/418 |
| 2,307,995 A | * | 1/1943 | Warren | 159/49 |
| 2,513,369 A | * | 7/1950 | Shaw | 34/364 |
| 2,527,488 A | * | 10/1950 | Schemm | 406/89 |
| 2,578,315 A | * | 12/1951 | Parker | 95/202 |
| 2,607,537 A | * | 8/1952 | Shaw | 241/47 |
| 2,677,167 A | * | 5/1954 | Ewing | 8/151.1 |
| 2,715,283 A | * | 8/1955 | Halldorsson | 34/79 |
| 2,869,249 A | * | 1/1959 | Kamp | 34/65 |
| 2,949,677 A | * | 8/1960 | Cameron | 34/255 |
| 2,957,067 A | * | 10/1960 | Scofield | 219/400 |
| 3,118,658 A | * | 1/1964 | Dennert | 432/58 |
| 3,330,046 A | * | 7/1967 | Albertus | 34/363 |
| 3,331,595 A | * | 7/1967 | Nelson et al. | 432/98 |
| 3,524,633 A | * | 8/1970 | Shiller | 432/67 |
| 3,744,145 A | * | 7/1973 | Maxwell et al. | 34/68 |
| 4,104,434 A | | 8/1978 | Johnson | |
| 4,137,029 A | * | 1/1979 | Brooks | 425/222 |
| 4,177,575 A | * | 12/1979 | Brooks | 34/392 |
| 4,254,557 A | * | 3/1981 | Mayer et al. | 34/249 |
| 4,254,558 A | * | 3/1981 | Mayer | 34/249 |
| 4,254,616 A | * | 3/1981 | Siminski et al. | 60/39.12 |

(Continued)

*Primary Examiner*—Stephen M. Gravini
(74) *Attorney, Agent, or Firm*—Robert D. Touslee

(57) ABSTRACT

A system and method of drying wet items including roving packages, cakes and bobbins of wound wet glass fibers and/or wet glass fiber strand(s) by first preheating the wet items using waste hot gases coming from any source including a glass furnace, a dryer or a heat engine operating to generate electrical power prior to removing much, most or all of the moisture in the wet roving packages, cakes and bobbins using a dielectric or microwave oven, to save energy, reduce drying costs and to increase the capacity of dielectric or microwave dryers.

20 Claims, 2 Drawing Sheets

U.S. PATENT DOCUMENTS

| | | | | |
|---|---|---|---|---|
| 4,255,166 A | * | 3/1981 | Gernand et al. | 95/27 |
| 4,255,403 A | * | 3/1981 | Mayer et al. | 423/244.06 |
| 4,280,415 A | * | 7/1981 | Wirguin et al. | 110/224 |
| 4,287,674 A | * | 9/1981 | Selivanov et al. | 34/201 |
| 4,383,377 A | * | 5/1983 | Crafton | 34/60 |
| 4,546,880 A | | 10/1985 | Reese | |
| 4,685,220 A | * | 8/1987 | Meenan et al. | 588/320 |
| 4,778,606 A | * | 10/1988 | Meenan et al. | 210/771 |
| 4,785,554 A | * | 11/1988 | Hederer et al. | 34/164 |
| 4,793,937 A | * | 12/1988 | Meenan et al. | 210/771 |
| 5,137,545 A | * | 8/1992 | Walker | 95/270 |
| 5,215,670 A | * | 6/1993 | Girovich | 210/770 |
| 5,263,267 A | * | 11/1993 | Buttner et al. | 34/519 |
| 5,428,906 A | * | 7/1995 | Lynam et al. | 34/379 |
| 5,557,873 A | * | 9/1996 | Lynam et al. | 34/379 |
| 5,603,751 A | * | 2/1997 | Ackerson | 95/268 |
| 5,613,642 A | | 3/1997 | Mulder et al. | |
| 5,946,818 A | * | 9/1999 | Baxter et al. | 34/379 |
| 6,158,145 A | * | 12/2000 | Landon et al. | 34/364 |
| 6,173,508 B1 | * | 1/2001 | Strohmeyer, Jr. | 34/578 |
| 6,421,931 B1 | * | 7/2002 | Chapman | 34/424 |
| 7,055,262 B2 | * | 6/2006 | Goldberg et al. | 34/86 |
| 7,404,262 B2 | * | 7/2008 | Jurkovich et al. | 34/381 |
| 2005/0066538 A1 | * | 3/2005 | Goldberg et al. | 34/218 |
| 2006/0179676 A1 | * | 8/2006 | Goldberg et al. | 34/77 |
| 2008/0229610 A1 | * | 9/2008 | Ronning | 34/514 |
| 2008/0289211 A1 | * | 11/2008 | Pinkham et al. | 34/259 |

* cited by examiner

METHOD OF DRYING ROVING PRODUCTS

The invention involves the use of waste heat from any source to preheat roving packages, cakes and bobbins, all containing wet fiber or fiber strands, prior to drying or partially drying in a dielectric or microwave oven.

BACKGROUND

It is known to make rovings for reinforcement of plastics and other materials by pulling fibers such as glass fibers from molten glass exiting tips of a fiberizing bushing, spraying a water mist on the fibers to cool the rapidly moving fibers followed by applying a conventional aqueous chemical sizing to the fibers, gathering the fibers into one or more strands and winding the strand(s) onto a rotating collet to form a wet roving package or cake. Roving packages are not finished products, but instead are tubular or cylindrical shapes of tightly wound wet glass fiber strands having square ends and a hollow cylindrical passage having the shape of the collet down the center of the package. Cakes are typically wound on a paper or plastic sleeve placed on the collet, the sleeve staying with the cake until the cake is dried. Cakes can be of different shapes, but typically are cylindrical with tapered end portions. When the wet fiber strands are wound on a shaped spool, bobbin, the bobbin stays with the fiber strands and are called bobbins of rovings strands of fiber or fiber, bobbins for short.

The wet roving package, cake or bobbin is then dried, usually in a gas fired or electric oven, to remove the water and to cure the binder in the sizing. Some typical processes for making such wound continuous fiber packages or cakes are disclosed in U.S. Pat. Nos. 4,546,880, 5,613,642 and pages 218-230, and elsewhere, of THE MANUFACTURING TECHNOLOGY OF CONTINUOUS GLASS FIBERS by K. L. Loewenstein, published by Elsevier (1983), the disclosures of which are herein incorporated by reference. This type of drying is very slow and also tends to cause the binder on the fibers to migrate to the surface resulting in a binder rich product in the outer layer of fiber strands on the roving package or cake, an undesirable result because much of this outer layer must be removed and discarded before shipping a roving product. It is known to reduce migration of the resin(s) in the sizing during drying by modifying the sizing composition as shown by U.S. Pat. No. 4,104,434, but this technique is frequently not usable with sizings aimed at achieving the optimum bonding with many polymers and properties in fiber reinforced composites.

Monorail systems are also known that move hangers through fiber forming rooms where the operators place wet roving packages and/or cakes on the hangers. The monorail system moves the cakes to either a staging area outside the forming rooms where the roving packages or cakes are transferred to either wheeled trucks or monorail type racks for holding a plurality of wet roving packages and/or cakes to be put into the drying chamber(s). Monorail systems are also known that run the wet cakes on hangers coming through the forming rooms directly into drying tunnel chambers to dry the wet roving packages and/or cakes using fuel/air burners or electrical resistance heating. It is also known to use dielectric drying to dry cakes and roving packages as disclosed in pages 228-229 of Loewenstein (see above cite), but total electrical drying is expensive, particularly where electrical costs are high.

It is also known to generate electricity using a gas turbine or other heat engine that exhausts gases at elevated temperatures and it is known to use these gases in a heat exchanger to preheat the air and/or gaseous fuel used to drive the gas turbine or heat engine.

SUMMARY OF THE INVENTION

The invention includes a method and system for preheating wet roving packages, cakes and bobbins of fiber or fiber strands using waste heat from any source. The waste heat should have a temperature of at least about 200 degrees C., typically is in a range of about 390-450 degrees C. or higher, but the temperature of waste exhaust gases can be hotter than 540 degrees C. The waste gases can contain steam and even be saturated with steam, e.g. some sources of waste heat include exhaust from drying sections and binder curing section of any dryer, from a heat engine like a gas turbine used in an electrical generating system, from a glass furnace before or following a heat exchanger or from a heat exchanger on a glass furnace, etc. Prior to feeding the hot waste gases into a preheating oven for the wet rovings, in packages, cakes or on bobbins, lower temperature air, including ambient air, water mist or steam can be blended with the hot waste gases prior to or in a portion of the preheat chamber to reduce the temperature and/or to increase the humidity in the blend, but the temperature of the hot waste gases or blends is usually maintained at or above 100 degrees C. prior to entry into the preheat chamber. The pressure of the hot waste gases coming from the sources named or equivalent sources is relatively low, usually less than 1 psi gauge, but can be boosted with one or more blowers to push the waste hot gases into and through the preheat chamber, with or without the aid of one or more exhaust fans on the preheat chamber.

The invention also includes a method and system for generating electricity using a drive for the electrical generator that is powered by a heat engine that uses high pressure, hot gases produced by combustion of a fuel and an oxygen bearing gas, using at least a portion of the electricity generated to power a microwave or dielectric dryer for fiber strand roving packages or cakes and using the waste heat from the engine to preheat wet fiber strand roving packages or cakes. Any type of enclosure can be used to contain the wet roving packages or cakes during preheating including conventional batch type chambers for wheeled trucks or monorail type racks, conventional tunnel chambers for wheeled trucks or monorail type racks or conventional tunnel chambers for monorail hangers for the roving packages or cakes, the latter being most typical, but instead of using electric heating or combustion burners to supply the hot gases in these chambers, in the invention the waste hot gases from the heat engine are used in these chambers to preheat the roving packages, cakes, bobbins, etc. When used herein, high pressure, hot gases is meant a gas or mixture of gases having a pressure of at least about 4 psi gauge and a temperature of at least about 440 degrees C.

Preheating the wet fiber glass roving packages, cakes or bobbins, the fibers having water and normally a conventional sizing composition on the surfaces of the fibers, to a temperature of at least about 35 or 40 degrees C., more typically at least about 55-60 decrees C. and more typically to at least about 70 degrees C. and most typically to at least about 85 degrees C. to at least just below the boiling point of water at the preheating location, using waste hot gases, such as from a heat engine or other source of waste hot gases. The system and method also include injecting ambient air and/or water spray mist into the hot waste gases to form a blend prior to, or as, the hot waste gases enter the preheat chamber, prior to the waste hot gases contacting the wet fiber items.

The preheating, done prior to placing the wet items into a dielectric or microwave drying oven, reduces or eliminates significant migration of the resin(s), polymer(s) in the sizing minimizes scrap when preparing the dried packages, cakes or bobbins for packaging and shipment. Also, the invention reduces drying costs by heating the wet packages, cakes and bobbins to near the boiling point of the water by using waste hot gases instead of costly electrical energy or expensive fuels for much or most of the energy needed to dry the wet packages, cakes and bobbins. Also, the capacity of the dielectric or microwave dryer is greatly increased due to the wet roving packages, cakes and bobbins being at an elevated temperature of at least about 35 or 40-60 degrees C. when they enter the dielectric or microwave dryer. The microwave or dielectric dryer is operated in a conventional manner, except that the productivity can be increased accordingly, or the power can be reduced at the same or similar productivity. By productivity is meant the weight of fiber rovings put through the dryer per unit of time.

When the word "about" is used herein it is meant that the amount or condition it modifies can vary some beyond that as long as the advantages of the invention are realized. Practically, there is rarely the time or resources available to very precisely determine the limits of all of the parameters of ones invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found having no further unexpected characteristics, the limits of those embodiments are within the meaning of the term about as used herein. It is not difficult for the artisan or others to determine whether such an embodiment is either as expected or, because of either a break in the continuity of results or one or more features that are significantly better than those reported by the inventor, is surprising and thus an unobvious teaching leading to a further advance in the art.

DETAILS OF SOME PREFERRED EMBODIMENTS

Figure 1:
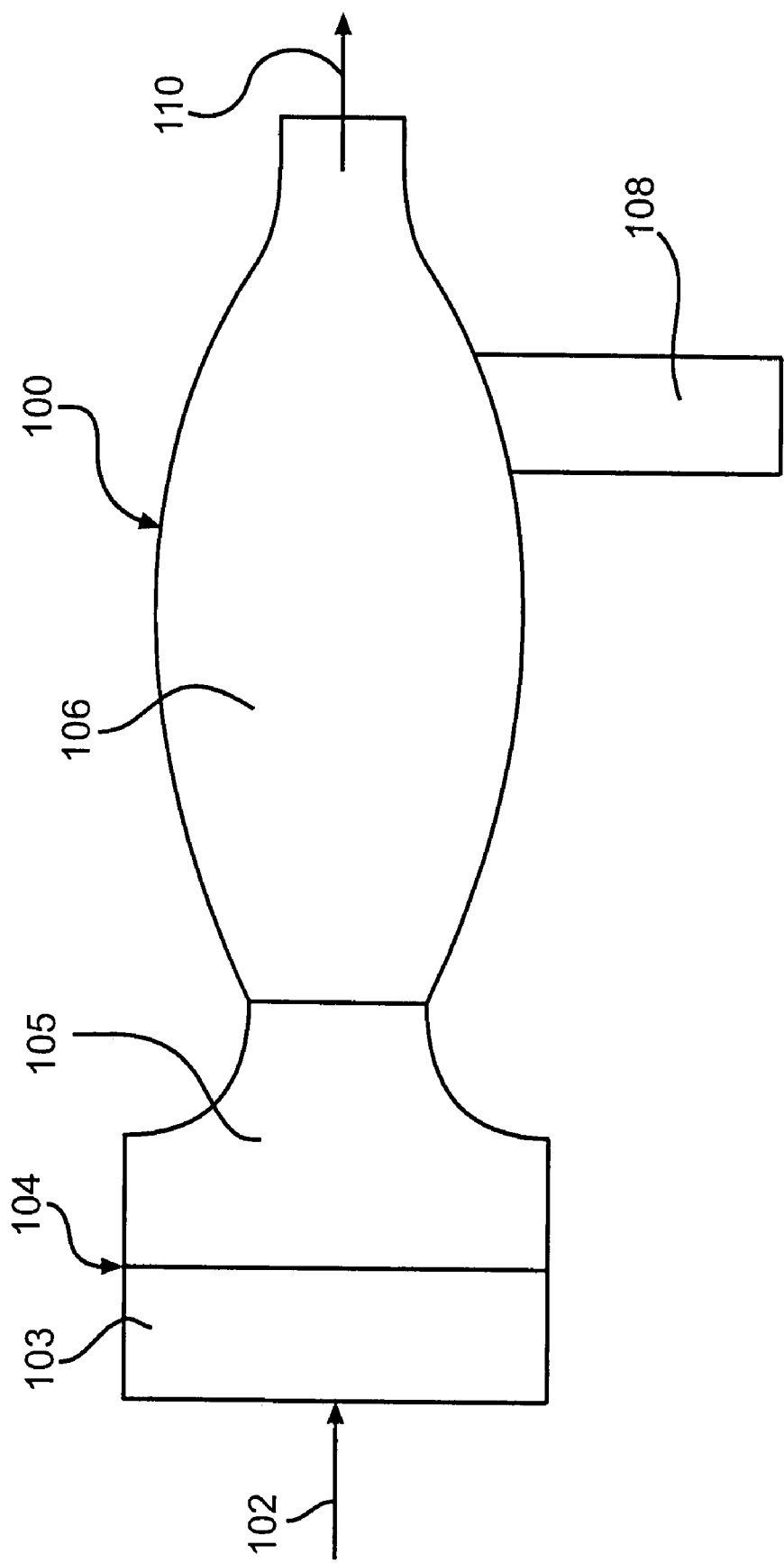
FIG. 1 is a schematic of a conventional gas turbine electrical generating system.

FIG. 1 is a schematic of a typical gas turbine driven electrical generating system 1. In this system an oxidizing gas 102 including air, oxygen or an oxygen rich mixture is fed to a compressor 103, driven by a heat engine such as a gas turbine 106. The oxidizing gas 102 is compressed and as it exits the compressor 103 into a combustion chamber 105, is mixed with a fuel 104 and ignited producing high pressure hot gases 107 that pass through the gas turbine 106 impacting blades in the turbine 106 causing them to rotate a shaft that drives the compressor 102 and an electrical generator 108 generating electricity. The high pressure hot gases 107 loose pressure as they expend work on the turbine blades and exit the gas turbine 106 as low pressure or atmospheric pressure hot gases 110, usually at a temperature of at least about 700 degrees F. or higher. Exhaust gas 110 temperatures of 1000 degrees F. or higher are fairly common.

Figure 2:
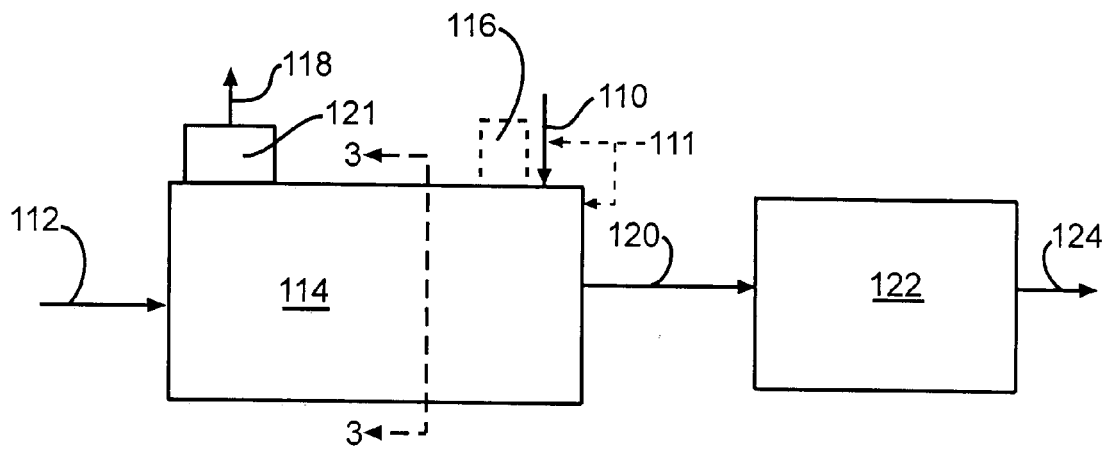
FIG. 2 is a schematic of a system of the invention for preheating and drying wet packages, cakes and bobbins of wet glass fibers.
Figure 3:
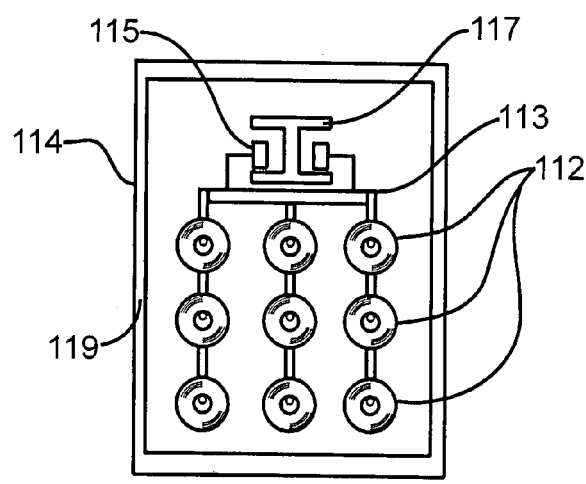
FIG. 3 is a cross section of a preheating chamber along lines 3-3 of FIG. 2.

In the invention, the hot waste exhaust gases 110 are used in a drying system like that shown in the schematic of FIG. 2 for preheating and drying glass fibers that have been previously conventionally coated with water or an aqueous conventional sizing, gathered into one or more strands and wound into roving packages, cakes and bobbins in a conventional manner. In the system of FIG. 2, the wet roving packages, cakes and/or bobbins 112, carried on any conventional apparatus for carrying wet fiber glass roving packages, cakes and/or bobbins through a dryer, such as shown in FIG. 3, are loaded into a chamber 114 where hot, waste gases 110, such as from the heat engine 106, are fed into the downstream, exit end portion of the chamber 114. The chamber 114 can have an optional auxiliary electrical or fossil fuel heat generator 116, if desired to supplement the hot gases 110 when the heat requirements of the chamber 114 at the production rate desired is greater than can be provided by the hot waste gases 110, but normally this is not required. Lower temperature gases 118 are exhausted at the entry end portion of the chamber 114, typically by using an exhaust fan 121 in a known manner. Optionally, cooler, ambient air, steam and/or water mist 111 can be fed into the duct carrying the hot waste gases 110 prior to their entry into the preheat chamber 114, or alternatively during entry or after the hot waste gases have entered the preheat chamber 114 as shown by the arrows 111, to reduce the temperature and/or to increase the humidity of the hot waste gases. The preheated, wet roving packages, cakes and/or bobbins 120 are then moved into a dielectric or microwave dryer 122 where the water in the packages is removed to form dry roving packages, cakes and/or bobbins 124 using conventional drying techniques.

FIG. 3 is a cross section of the chamber 114 along lines 3-3 of FIG. 2 and shows the wet roving packages, cakes or bobbins 112 supported and carried, in this embodiment, by a conventional electrically non-conductive monorail rack 113 having wheels 115 supported with a monorail 117. Walls 119 of the chamber 114 are typically, but not necessarily, insulated to conserve heat energy. Sometimes it may be desirable to use electrically conductive, such as steel, racks for the rack 113 in the forming room where the roving packages, cakes and bobbins are formed and in the preheating chamber 114. In that case, the preheated roving packages, cakes and bobbins 120 are removed from the electrically conductive racks and placed on non-conductive racks or conveyor belt before inserting the preheated roving packages, cakes and/or bobbins into the dielectric or microwave dryer 122. The dried roving packages, cakes and bobbins 124 are then processed into a variety of finished products using known techniques and equipment.

While the system of FIGS. 2 and 3 show using monorail racks for supporting and carrying the wet roving packages, cakes and bobbins, any conventional equipment normally used for this purpose can be used including rail rack cars, conveyor belts, carriers for individual roving packages, cakes and bobbins, etc. In the system of the invention shown in FIGS. 2 and 3, some moisture will be removed from the wet roving packages, cakes and bobbins during preheating.

Figure 4:
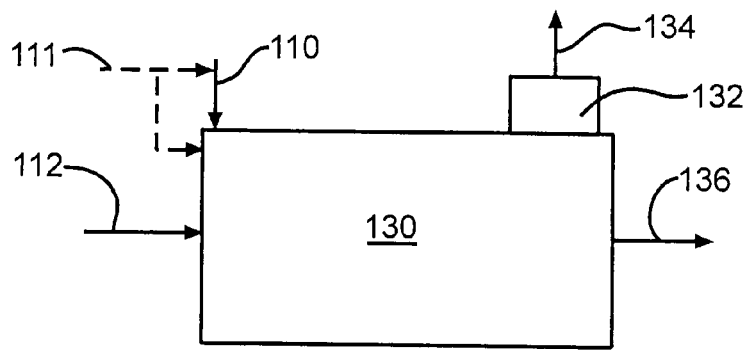
FIG. 4 is a schematic of another embodiment of a preheating chamber for use in the system shown in FIG. 2.

When it is desired to minimize the amount of moisture loss during preheating, the preheating chamber can be changed as shown in FIG. 4. In this system, the preheating chamber 130 the hot waste gases 110 are drawn into the entry end portion of the preheating chamber 130 through the preheating chamber 130 and exhausted out of the exit end portion of the preheat chamber 130 with an exhaust fan 132 located outside the exit end portion of the preheating chamber 130. In this system, the exhaust gases 134 have a high relative humidity, relative to heated air, and because of this, remove only a minimal amount of moisture from the wet roving packages, cakes and bobbins in the downstream half of the preheating chamber 130, but do remove some moisture in the upstream half of the preheating chamber 130. This can be reduced by spraying a fine mist of water into the hot waste gases in the hot waste gases duct or ducts prior to entering the preheat chamber 130 or in the entry end portion of the preheating chamber 130 near where the hot waste gases 110 enter, but some preheating capacity will be sacrificed by this action due to the loss of energy in converting this water mist into steam and the resultant drop in the temperature of the waste hot gases in the entry end portion of the chamber 130. Optionally, cooler ambient air, steam and/or water mist 111 can be fed into the duct carrying the hot waste gases 110 prior to their entry into the preheat chamber 130, or alternatively during entry or after the hot waste gases have entered the preheat chamber 130 as shown by the arrows 111, to reduce the temperature and/or to increase the humidity of the hot waste gases.

In a method of the invention, wet roving packages, cakes and bobbins of wound glass fiber strands containing water in the range of about 10 wt. percent to about 25 wt. percent, or higher, and supported on conventional roving package, cake and bobbin supporting apparatus are placed into a preheating chamber where they are exposed to hot waste gases from a heat engine, the temperature of the hot waste gases being as high as about 450 degrees C. or lower, but usually at least about 100 degrees C. until the temperature of at least an exterior portion of the roving packages, cakes and bobbins are at least about 35 or 40-60 degrees C., and usually below the boiling point of the water, by the time the fiber rovings reach the end of the preheat chamber. These hot wet roving packages, cakes and/or bobbins 120 or 136 are then fed into another chamber or an extension of the preheating chamber where at least most of the water in the wet roving packages, cakes and/or bobbins is removed by dielectric or microwave heating of the water to produce dried roving packages, cakes and bobbins of glass fiber or glass fiber strands, the glass fibers most often coated with a polymer or chemical sizing. The moisture content of the dried roving packages, cakes and bobbins is typically less than about 5-10 wt. percent, more typically less than about 3-7 wt. percent and most typically less than about 1-3 wt. percent, including bone dry.

When using microwave drying, a typical set up would be an electrode zone of about 10.8 meters and a drying frequency of about 13-14 Mhz. The capacity of the microwave dryer depends upon the type and size of roving packages, cakes or bobbins being dried, the length of the electrode or microwave zone, the temperature and moisture content of roving packages, cakes and bobbins entering the microwave dryer and the arrangement of the roving packages, cakes and bobbins in the microwave dryer, as is well known except for the temperature of the roving packages, cakes and bobbins entering the dryer. In any event, the capacity of any microwave and dielectric dryer is greatly enhanced by preheating the roving packages, cakes and bobbins to a temperature of at least about 40-60 degrees C.

When desired, it is also a part of the systems and methods of the invention to inject cooler air, ambient air and/or steam and/or a water spray mist into the waste hot gases to form a blend of hot gases prior to, during or just after inserting the blend of hot gases into the preheating chamber.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

The invention claimed is:

1. A system for drying wet items including wet roving packages, wet cakes and bobbins of wound wet fiber glass fibers or wet fiber strands comprising a microwave or dielectric oven for subjecting the wet roving packages, cakes and/or bobbins to dielectric waves or microwaves until the moisture content of the roving packages, cakes and bobbins is less than about 10 wt. percent, the improvement comprising;

a preheating chamber for preheating the wet roving packages, cakes and/or bobbins to at least about 55 degrees C., but below the boiling point of water at the location of the preheating chamber, a duct for transporting waste hot gases exhausted from a source selected from a group consisting of a glass furnace, a dryer, and a heat engine operating to generate electrical power, into the preheating chamber and a fan for causing the waste hot gases to enter the preheating chamber and to exit the preheat chamber, the preheating chamber being located upstream of the microwave or dielectric oven.

2. The system as described in claim 1 wherein the roving packages, cakes and bobbins are preheated to at least about 60 degrees C.

3. The system as described in claim 1 wherein the system comprises a heat engine for generating electricity.

4. The system as described in claim 3 wherein the heat engine is a gas turbine and wherein the duct is for carrying waste heat cases exhausted from the gas turbine.

5. The system of claim 1 wherein the system further comprises a duct for carrying waste heat gases exhausted from a glass furnace.

6. The system of claim 1 wherein the system further comprises a duct for carrying waste heat gases exhausted from a dryer.

7. A method of drying wet roving packages, cakes and/or bobbins of wound wet glass fibers or wet strands of glass fibers by placing the wet roving packages, cakes and bobbins into a microwave or dielectric oven and subjecting the wet roving packages, cakes and bobbins to dielectric waves or microwaves until the moisture content of the roving packages, cakes and bobbins is less than about 10 wt. percent, the improvement comprising;

first preheating the wet roving packages, cakes or bobbins to at least about 55 degrees C., but below the boiling point of water at the preheating location, using waste hot gases waste hot gases exhausted from a heat engine operating to generate electrical power, a glass furnace or a dryer.

8. The method of claim 7 wherein the waste hot gases have a temperature of at least about 100 degrees C. and wherein the wet items are preheated to at least about 60 degrees C. using the waste hot gases.

9. The method of claim 8 wherein the waste hot gases are exhausted by a gas turbine engine.

10. The method of claim 9 wherein the temperature of the waste hot gases are at least about 343 degrees C. prior to being blended with cooler air, steam, a water mist or a mixture of two or more of cooler air, steam, a water mist.

11. The method of claim 10 wherein ambient air and/or water mist is blended with the waste hot gases to form blended hot gases prior to contacting the items.

12. The method of claim 11 wherein the blended hot gases first contact the wet items after they have been preheated to at least about 40 degrees C.

13. The method of claim 12 wherein the blended hot gases first contact the wet items soon after they have been placed into a preheating chamber.

14. The method of claim 8 wherein the waste hot gases first contact the wet items after they have been preheated to at least about 40 degrees C.

15. The method of claim 8 wherein the waste hot gases first contact the wet items after they have been preheated to at least about 70 degrees C.

16. The system of claim 4 wherein the duct carrying the waste hot gases enters a preheating chamber near an entrance end of the preheating chamber.

17. The system of claim 4 wherein the duct carrying the waste hot gases enters a preheating chamber near an exit end of the preheating chamber.

18. The method of claim 7 wherein the temperature of the hot waste gases is at least about 225 degrees C.

19. The method of claim 7 wherein the temperature of the hot waste gases is at least about 250 degrees C.

20. The method of claim 7 wherein the temperature of the hot waste gases is at least about 400 degrees C. and wherein the items are preheated to a temperature of at least 75 degrees C.

* * * * *